US012255997B2

(12) United States Patent
Wong et al.

(10) Patent No.: US 12,255,997 B2
(45) Date of Patent: Mar. 18, 2025

(54) METHOD OF COMMUNICATION BETWEEN FUNCTIONAL BLOCKS IN A SYSTEM-ON-CHIP AND SYSTEM-ON-CHIP THEREOF

(71) Applicant: Agency for Science, Technology and Research, Singapore (SG)

(72) Inventors: Ming Ming Wong, Singapore (SG); Anh Tuan Do, Singapore (SG); Kevin Tshun Chuan Chai, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 266 days.

(21) Appl. No.: 17/799,898

(22) PCT Filed: Feb. 26, 2020

(86) PCT No.: PCT/SG2020/050089
§ 371 (c)(1),
(2) Date: Aug. 15, 2022

(87) PCT Pub. No.: WO2021/173070
PCT Pub. Date: Sep. 2, 2021

(65) Prior Publication Data
US 2023/0106942 A1 Apr. 6, 2023

(51) Int. Cl.
*G06F 21/42* (2013.01)
*H04L 9/00* (2022.01)
(Continued)

(52) U.S. Cl.
CPC ............ *H04L 9/0891* (2013.01); *H04L 9/005* (2013.01); *H04L 9/0863* (2013.01); *H04L 9/12* (2013.01)

(58) Field of Classification Search
CPC ..... H04L 9/0891; H04L 9/005; H04L 9/0863; H04L 9/12
See application file for complete search history.

(56) References Cited

U.S. PATENT DOCUMENTS 6,061,449 A 5/2000 Candelore et al.
9,015,853 B2 4/2015 Stefanov et al.
(Continued)

FOREIGN PATENT DOCUMENTS

WO 2014154280 A1 10/2014
WO 2019117978 A1 6/2019
WO WO-2022112620 A2 * 6/2022 ............. G06F 21/14

OTHER PUBLICATIONS

Awad Amro, Deborah Shands, Yan Solihin, Yipeng Wang; ObfusMem: A Low-Overhead Access Obfuscation for Trusted Memories; ACM; ISCA '17: Proceedings of the 44th Annual International Symposium on Computer Architecture; Jun. 2017; pp. 107-119 (Year: 2017).*
(Continued)

*Primary Examiner* — Fatoumata Traore
*Assistant Examiner* — Courtney D Fields
(74) *Attorney, Agent, or Firm* — Shackelford, Mckinley & Norton, LLP

(57) ABSTRACT

There is provided a method of communication between functional blocks in a system-on-chip. The method includes: exchanging a respective public key between a first functional block and a second functional block in the system-on-chip (SoC) for a communication therebetween, the first functional block being a transmitter of the communication and the second function block being a receiver of the communication; generating, at the first functional block, a first code based on the public key of the second functional block; generating, at the second functional block, a second code based on the public key of the first functional block; obfuscating, at the first functional block, an address associated with the communication based on the first code to produce an obfuscated address; transmitting, at the first functional block, the obfuscated address to the second functional block via an interconnect communication infrastructure in the system-on-chip; receiving, at the second
(Continued)

functional block, the obfuscated address from the first functional block via the interconnect communication infrastructure; and deobfuscating, at the second functional block, the obfuscated address received based on the second code to produce a deobfuscated address associated with the communication. There is also provided a corresponding system-on-chip.

18 Claims, 10 Drawing Sheets

(51) Int. Cl.
*H04L 9/08* (2006.01)
*H04L 9/12* (2006.01)
*G06F 12/14* (2006.01)
*G06F 21/32* (2013.01)

(56) References Cited

U.S. PATENT DOCUMENTS

| | | | |
|---|---|---|---|
| 2010/0306854 | A1 | 12/2010 | Neergaard |
| 2017/0104586 | A1* | 4/2017 | Hars ............... H04L 9/003 |
| 2017/0185534 | A1 | 6/2017 | Wagh et al. |
| 2018/0011995 | A1 | 1/2018 | Pitu |
| 2018/0343119 | A1* | 11/2018 | Chen ............... H04L 9/14 |
| 2022/0414024 | A1* | 12/2022 | Gong ............... G06F 21/78 |

OTHER PUBLICATIONS

Aijiao Cui; Yanhui Luo; Chip-Hong Chang; "Static and Dynamic Obfuscations of Scan Data Against Scan-Based Side-Channel Attacks"; IEEE Transactions on Information Forensics and Security; Year: Feb. 2017 | vol. 12, Issue: 2 | Journal Article | Publisher: IEEE; pp. 363-376 (Year: 2017).*

Maxim Integrated Products, "DS5002FP Secure Microprocessor Chip," https://www.analog.com/media/en/technical-documentation/data-sheets/ds5002-ds5002fp.pdf, 2006, pp. 1-25.

Elbaz et al., "Hardware Engines for Bus Encryption: A Survey of Existing Techniques," IEEE Proceedings of the Design, Automation and Test in Europe, Munich, Germany, Mar. 2005, pp. 40-45.

Awad et al., "ObfusMem: A Low-Overhead Access Obfuscation for Trusted Memories," SIGARCH Computer Architecture News, vol. 45, No. 2, Jun. 2017, pp. 107-119.

Devadas et al., "Onion ORAM: A Constant Bandwidth Blowup Oblivious RAM," 13th International Conference on Theory of Cryptography, 2016, Tel Aviv, Israel, Jan. 10-13, 2016, Lecture Notes in Computer Science, pp. 145-174.

Fletcher et al., "Freecursive ORAM: [Nearly] Free Recursion and Integrity Verification for Position-based Oblivious RAM," SIGARCH Computer Architecture News, vol. 43, No. 1, Mar. 2015, pp. 103-116.

Goldreich et al., "Software Protection and Simulation on Oblivious RAMs," Journal of the ACM, vol. 43, No. 3, May 1996, pp. 431-473.

Liang et al., "MemCloak:: Practical Access Obfuscation for Untrusted Memory," Proceedings of the 34th Annual Computer Security Applications Conference, New York, NY, U.S.A., 2018, pp. 187-197.

Shafiee et al., "Secure DIMM: Moving ORAM Primitives Closer to Memory," IEEE International Symposium on High Performance Computer Architecture (HPCA), Feb. 2018, pp. 428-440.

Stefanov et al., "Path ORAM: An Extremely Simple Oblivious RAM Protocol," Proceedings of the 2013 ACM SIGSAC Conference on Computer & Communications Security, New York, NY, U.S.A., 2013, pp. 299-310.

International Search Report for International Application No. PCT/SG2020/050089 dated Apr. 6, 2020, pp. 1-4.

Written Opinion of the International Searching Authority for International Application No. PCT/SG2020/050089 dated Apr. 6, 2020, pp. 1-5.

Zhuang et al., "HIDE: An Infrastructure for Efficiently Protecting Information Leakage on the Address Bus," Proceedings of the 11th International Conference on Architectural Support for Programming Languages and Operating Systems, Oct. 13, 2004, pp. 72-84.

* cited by examiner

| Aspect | Software Data Obfuscation | Hardware Access Pattern Obfuscation | Lightweight Communication Obfuscation |
|---|---|---|---|
| ORAM factor | ORAM-inspired solution | Address obfuscation with/without ORAM semantics | No ORAM |
| Computation speed | Very slow (~80x reduction) | Relatively fast with minimal access latency | Very fast (no to low-bandwidth reduction) |
| Software/ Hardware changes | Software-based No hardware change | Changes in both software and hardware | Hardware-based No software change |
| Metadata storage | Excessive and resides in CPU | Partition storage in both CPU and memory | No metadata required |
| Protocol changes | Changes required for different communication protocol | Customized to specific memory access protocol | Applicable to heterogeneous communication traffic on hardware |
| Overhead | Excessive communication overhead | Substantial communication overhead | No communication overhead |
| Security | Fixed security parameter | Fixed security parameter | Flexibility in security mode selection |
| Application | Memory related communication | Memory related communication | Generic communication |

FIG. 5

METHOD OF COMMUNICATION BETWEEN FUNCTIONAL BLOCKS IN A SYSTEM-ON-CHIP AND SYSTEM-ON-CHIP THEREOF

TECHNICAL FIELD

The present invention generally relates to a method of communication between functional blocks in a system-on-chip (SoC) and a SoC thereof, and more particularly, with enhanced communication security.

BACKGROUND

System-on-chip (SoC) provides complex solution for several challenging design problems across various application domains. The system may be integrated with single or multiple processors, volatile or non-volatile memory blocks, complex hardware accelerators and various functional blocks. For illustration purpose only, FIGS. 1A and 1B illustrate two types of interconnect communication infrastructures for a SoC, namely, a bus infrastructure as shown in FIG. 1A and a network infrastructure as shown in FIG. 1B.

High density SoC integration leads to a large volume of diversified and heterogeneous communication traffic in the architecture. Besides that, these communications may be established using different mechanisms and protocols, such as standard bus-based interconnect systems (e.g., AMBA, AXI, Wishbone, Avalon, and so on) and networks-on-chip (NoC) routers via programmable interfaces for higher flexibility.

The wide diversity of computational requirements across different micro-architecture elements in the SoC tends to leak side channel information (e.g., power consumption and timing latency) of the underlying hardware when the communications take place. While the confidentiality and the integrity of the sensitive data (communication content) can be protected via encryption and authentication, the access addresses (i.e., the destination addresses) of those sensitive data upon communication are transmitted plainly across the system's interconnections.

Several Side-channel Attacks (SCA), such as timing attack, power-monitoring attack and cache attack, may make use of communication patterns to reveal the reused code during the program execution and to leak critical data, such as the cryptographic keys. This communication pattern refers to, in particular, the address sequence stream and the frequency of the repetitive communications between the computational blocks.

State-of-the-art obfuscation techniques reported in the literature are mainly based on the Oblivious RAM (ORAM), such as the Path ORAM and its variants. These solutions work by inferring excessive dummy accesses such that the location is reshuffled after each access. Though such mechanism may effectively hide the real access patterns, its implementations on hardware is impractical and suffers from overheads in terms of storage capacity, communication latency and with the possibility of system deadlock. Thus, ORAM inspired obfuscation are commonly deployed as a software solution, such as for a server-client environment. On the other hand, existing hardware-based obfuscation mechanisms (with and without ORAM semantics) are specifically designed and customized for memory access pattern obfuscation.

A need therefore exists to provide a method of communication between functional blocks in a SoC and a SoC thereof, that seek to overcome, or at least ameliorate, one or more of the deficiencies in existing or conventional communication methods in SoC, such as but not limited to, enhancing communication security in SoC. It is against this background that the present invention has been developed.

SUMMARY

According to a first aspect of the present invention, there is provided a method of communication between functional blocks in a system-on-chip, the method comprising:
  exchanging a respective public key between a first functional block and a second functional block in the system-on-chip for a communication therebetween, the first functional block being a transmitter of the communication and the second function block being a receiver of the communication;
  generating, at the first functional block, a first code based on the public key of the second functional block;
  generating, at the second functional block, a second code based on the public key of the first functional block;
  obfuscating, at the first functional block, an address associated with the communication based on the first code to produce an obfuscated address;
  transmitting, at the first functional block, the obfuscated address to the second functional block via an interconnect communication infrastructure in the system-on-chip;
  receiving, at the second functional block, the obfuscated address from the first functional block via the interconnect communication infrastructure; and
  deobfuscating, at the second functional block, the obfuscated address received based on the second code to produce a deobfuscated address associated with the communication.

According to a second aspect of the present invention, there is provided a system-on-chip comprising:
  a first functional block; and
  a second functional block communicatively coupled to the first functional block via an interconnect communication infrastructure,
  wherein the first functional block comprises an address encoder, the address encoder comprising:
    a first public key generator configured to exchange a public key with the second functional block for a communication between the first functional block and the second functional block, the first functional block being a transmitter of the communication and the second function block being a receiver of the communication;
    a first code generator configured to generate a first code based on the public key of the second functional block;
    an address obfuscator configured to obfuscate an address associated with the communication based on the first code to produce an obfuscated address; and
    an address transmitter configured to transmit the obfuscated address to the second functional block via the interconnect communication infrastructure in the system-on-chip,
  wherein the second functional block comprises an address decoder, the address decoder comprising:
    a second public key generator configured to exchange a public key with the first functional block for the communication;

a second code generator configured to generate a second code based on the public key of the first functional block;
an address receiver configured to receive the obfuscated address from the first functional block via the interconnect communication infrastructure; and
an address deobfuscator configured to deobfuscate the obfuscated address received based on the second code to produce a deobfuscated address associated with the communication.

According to a third aspect of the present invention, there is provided a method of forming a system-on-chip, the method comprising:
forming a first functional block on a substrate; and
forming a second functional block on the substrate, the second functional block being communicatively coupled to the first functional block via an interconnect communication infrastructure,
wherein the first functional block comprises an address encoder, the address encoder comprising:
a first public key generator configured to exchange a public key with the second functional block for a communication between the first functional block and the second functional block, the first functional block being a transmitter of the communication and the second function block being a receiver of the communication;
a first code generator configured to generate a first code based on the public key of the second functional block;
an address obfuscator configured to obfuscate an address associated with the communication based on the first code to produce an obfuscated address; and
an address transmitter configured to transmit the obfuscated address to the second functional block via an interconnect communication infrastructure in the system-on-chip,
wherein the second functional block comprises an address decoder, the address decoder comprising:
a second public key generator configured to exchange a public key with the first functional block for the communication;
a second code generator configured to generate a second code based on the public key of the first functional block;
an address receiver configured to receive the obfuscated address from the first functional block via the interconnect communication infrastructure; and
an address deobfuscator configured to deobfuscate the obfuscated address received based on the second code to produce a deobfuscated address associated with the communication.

BRIEF DESCRIPTION OF THE DRAWINGS

Embodiments of the present invention will be better understood and readily apparent to one of ordinary skill in the art from the following written description, by way of example only, and in conjunction with the drawings, in which:
FIG. 5 depicts a table showing example comparisons between conventional ORAM-based designs and a communication pattern obfuscation design according to various example embodiments of the present invention.

DETAILED DESCRIPTION

Various embodiments of the present invention provide a method of communication between functional blocks in a system-on-chip (SoC) and a SoC thereof, and more particularly, with enhanced communication security, such as but not limited to, preventing or mitigating side-channel attacks.

A SoC is known in the art and thus need not be described in detail. In general, a SoC may be an integrated circuit that integrates an entire electronic or computer system onto a single platform (single substrate). The SoC may include at least one processor (processor block), at least one memory (memory block) and various other functional blocks integrated on a single substrate. It will be appreciated that a SoC may be designed or configured to perform one or more practical applications, as desired or as appropriate, such as but not limited to, signal processing, wireless communication, and so on. It will also be appreciated that the SoC may have any number of functional blocks integrated therein as desired or as appropriate.

Communication pattern within a complex SoC potentially leaks side channel information which can be exploited by an adversary to attack the system or to breach confidential information. Various embodiments of the present invention identified that, in the present state-of-art of secured SoC, the communication content (i.e., data) may be encrypted but the access addresses (i.e., destination addresses) remain unprotected. This exposes the communication pattern between the transmitting and the receiving hosts. As a result, for example, the communication behaviour and its patterns potentially reveals the characteristic of sensitive computations in the functional blocks in the SoC, which can be exploited by attackers. Therefore, various embodiments seek to provide or enable privacy and trusted communications in order to establish a secured interconnection within the SoC. In this regard, various embodiments identified that addresses of communications (e.g., sensitive communications) need to be efficiently obfuscated. Accordingly, various embodiments of the present invention provide a method of communication between (or amongst) functional blocks in SoC and a SoC thereof, and more particularly, with enhanced communication security, such as but not limited to, preventing or mitigating side-channel attacks. In various embodiments, there is provided a lightweight communication pattern obfuscation method that is applicable for heterogeneous data communication traffic in SoC and for both bus-based and network-based interconnection systems.

Figure 1A:
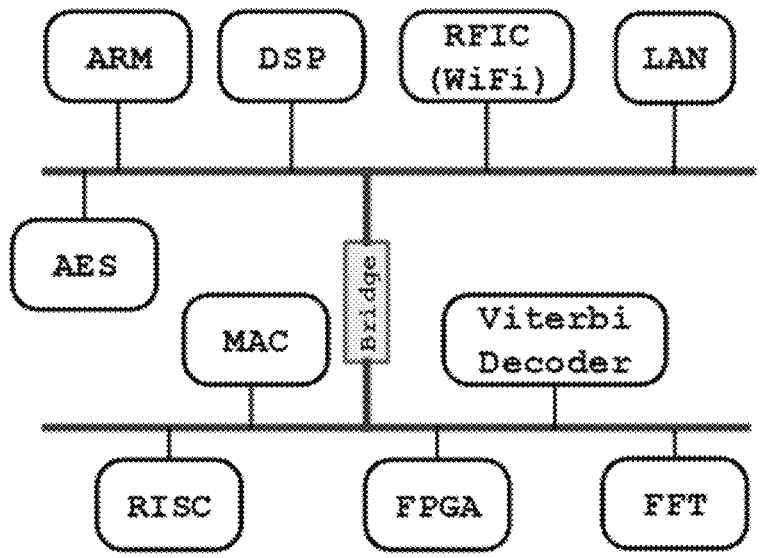
FIGS. 1A and 1B illustrate two types of interconnect communication infrastructures for a SoC.
Figure 1B:
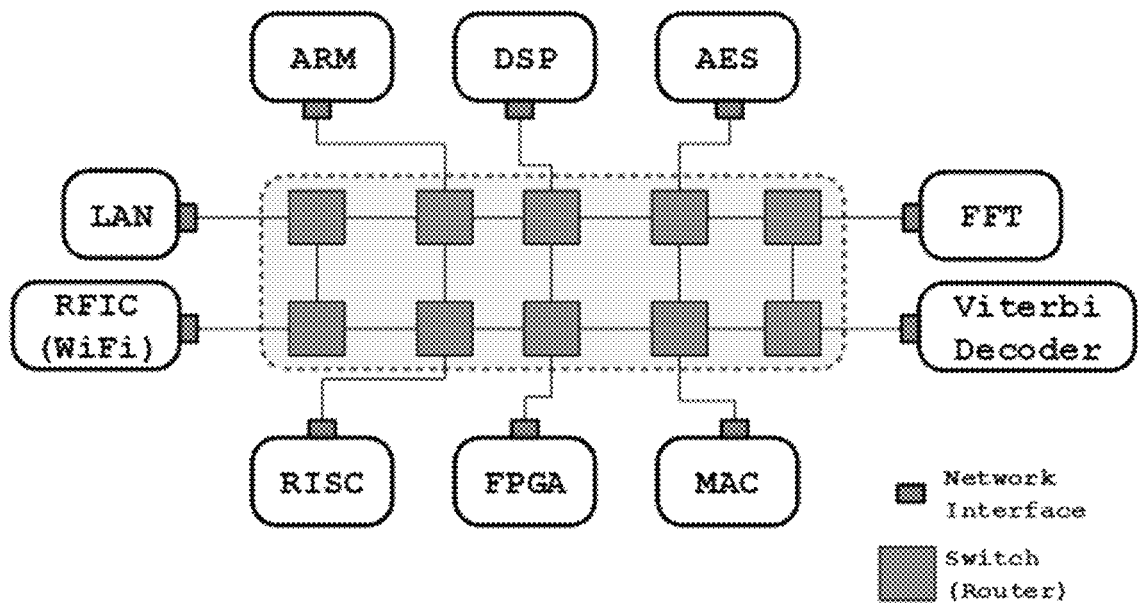
Figure 2:
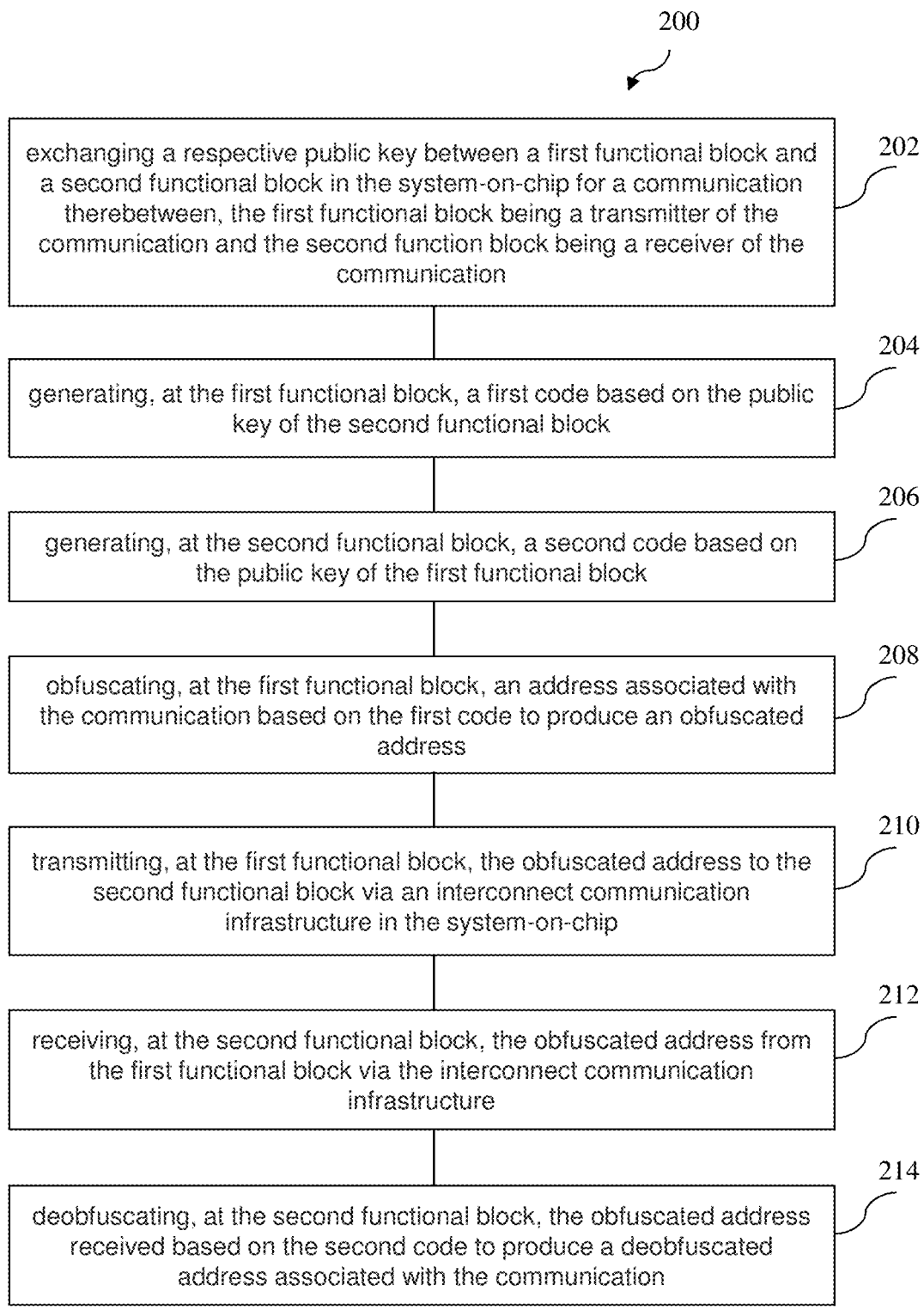
FIG. 2 depicts a schematic flow diagram of a method of communication between functional blocks in a SoC, according to various embodiments of the present invention.

FIG. 2 depicts a flow diagram of a method 200 of communication between (or amongst) functional blocks in a SoC, according to various embodiments of the present invention. The method 200 comprising: exchanging (at 202) a respective public key between a first functional block and a second functional block in the SoC for a communication (e.g., data communication for transferring data) therebetween, the first functional block being a transmitter of the communication and the second function block being a receiver of the communication; generating (at 204), at the first functional block, a first code based on the public key of the second functional block; generating (at 206), at the second functional block, a second code based on the public key of the first functional block; obfuscating (at 208), at the first functional block, an address associated with the communication based on the first code to produce an obfuscated address; transmitting (at 210), at the first functional block, the obfuscated address to the second functional block via an interconnect communication infrastructure in the SoC; receiving (at 212), at the second functional block, the obfuscated address from the first functional block via the interconnect communication infrastructure; and deobfuscating (at 214), at the second functional block, the obfuscated address received based on the second code to produce a deobfuscated address associated with the communication.

It will be appreciated by a person skilled in the art that the above-mentioned functional blocks may be any functional blocks formed in the SoC for various purposes or practical applications, such as but not limited to, a processor (e.g., digital signal processor), a memory, and so on. In this regard, for example, any two functional blocks in the SoC may communication (e.g., transfer data) with each other and various embodiments of the present invention provide a method or technique that seeks to enhance the security of such communications between functional blocks in the SoC, such as but not limited to, preventing or mitigating side-channel attacks. Accordingly, the method of communication between functional blocks in the SoC may be applied to each communication between any two functional blocks in the SoC. In various embodiments, the functional blocks are each a physical functional block, that is, implemented at least in part by a hardware component (e.g., a circuit or an electronic component).

In various embodiments, the address associated with a communication refers to the access address (which may also be referred to as the destination address) of the communication. That is, the address of the destination (a functional block) of the communication.

In relation to 208, the first code may serve as a seed for initializing an address obfuscator. In relation to 214, the second code may serve as a seed for initializing an address deobfuscator. In various embodiments, the address obfuscator and the address deobfuscator may both involve a stochastic function (which may also be referred to as a random function).

Therefore, according to various embodiments, the address associated with a communication between functional blocks in SoC is advantageously protected or secured, thus enhancing communication security (e.g., privacy), such as but not limited to, preventing or mitigating side-channel attacks. In addition, as the address is obfuscated at the first function block (transmitter of the communication) using a code generated based on a public key of the second functional block (receiver of the communication) and the address is deobfuscated at the second function block using a code generated based on a public key of the first functional block, the identities of the first and second functional blocks are advantageously authenticated, thus further enhancing communication security (e.g., trusted communication). For example, prior to a communication between two functional blocks, the address from the transmitting host (e.g., corresponding to the above-mentioned "first functional block") is obfuscated. Furthermore, the method 200 of communication is configured such that only the intended receiving host (e.g., corresponding to the above-mentioned "second functional block") is able to deobfuscate the obfuscated address to retrieve the original address. This enables the communication to remain private between the two functional blocks (e.g., the two authorized communicating hosts), thereby enhancing communication security in the SoC.

In various embodiments, the first code generated at the first functional block and the second code generated at the second functional block are the same. In this regard, in various embodiments, the first code generated at the first functional block and the second code generated at the second functional block are the same at corresponding time instances (e.g., an effective transmitting time and an effective receiving time, respectively) with respect to a communication between the first functional block and the second functional block. That is, in various embodiments, there is a time latency (or time delay) between the first and second functional blocks such that the first and second codes generated are the same at the corresponding time instances (e.g., the effective transmitting time and the effective receiving time, respectively) with respect to the communication. In various embodiments, the effective transmitting time of a communication refers to the time at which the first functional block generates the first code based on which the address associated with the communication is obfuscated, and the effective receiving time of the communication refers to the time at which the second functional block generates the second code based on which the obfuscated address received from the first functional block is deobfuscated.

In various embodiments, the method 200 further comprises: generating, at each of the first functional block and the second functional block, a respective secret key for the communication; and generating, at each of the first functional block and the second functional block, the respective public key based on the respective secret key. That is, at the first functional block, a secret key is generated for the communication and the public key of the first functional block is generated based on the secret key. Similarly, at the second functional block, a secret key is generated for the communication and the public key of the second functional block is generated based on the secret key.

In various embodiments, the above-mentioned generating (at 204), at the first functional block, the first code comprises generating a new first code periodically based on a first time interval. In various embodiments, the above-mentioned generating (at 206), at the second functional block, the second code comprises generating a new second code periodically based on a second time interval. Accordingly, the first code generated at the first functional block and the second code generated at the second functional block are each refreshed periodically, such as at the expiry of the respective time interval. In this regard, with respect to the first functional block, such a time interval may advantageously correspond to a lifespan of a function for generating a series of random sequences for obfuscating the address, and similarly, with respect to the second functional block, such a time interval may advantageously correspond to a lifespan of a function for generating a series of random sequences for deobfuscating the obfuscated address. Accordingly, for example, as the first code is refreshed (or re-initialized) periodically, freshness or unpredictability (without knowledge of the first code) of the series of random sequences generated at the first functional block (generated based on the first code) for obfuscating the address (which will be described below) can be achieved.

In various embodiments, the above-mentioned obfuscating (at 208), at the first functional block, the address associated with the communication comprises: generating a first random sequence based on the first code; and obfuscating (e.g., masking) the address based on the first random sequence to produce the obfuscated address. In various embodiments, the above-mentioned deobfuscating (at 214), at the second functional block, the obfuscated address comprises: generating a second random sequence based on the second code; and deobfuscating (e.g., unmasking) the address based on the second random sequence to produce the deobfuscated address associated with the communication.

In various embodiments, the above-mentioned generating the first random sequence comprises generating the first random sequence based on a first stochastic function (which may also be referred to as a first random function), the first stochastic function being synchronized based on a first input clock signal and initialized by the first code functioning as a seed to the first stochastic function. In various embodiments, the above-mentioned generating the second random sequence comprises generating the second random sequence based on a second stochastic function, the second stochastic function being synchronized based on a second input clock signal and initialized by the second code functioning as a seed to the second stochastic function.

In various embodiments, the first stochastic function may be configured to generate a first series of unique random sequences based on the first code functioning as a seed to the first stochastic function. In this regard, as described hereinbefore, a new first code may be generated periodically based on a first time interval. Accordingly, the lifespan of the first stochastic function corresponds to (i.e., equal to) the first time interval. Furthermore, as the first code is refreshed (or re-initialized) periodically, freshness or unpredictability of the first series of unique random sequences generated at the first functional block (which is generated based on the first code) for obfuscating the address can be achieved. In other words, the end of the lifespan of the first stochastic function is re-initialized periodically based on the new first code to achieve freshness or unpredictability of the first series of unique random sequences generated. Similarly, the second stochastic function may be configured to generate a second series of unique random sequences based on the second code functioning as a seed to the second stochastic function. In this regard, as described hereinbefore, a new second code may be generated periodically based on a second time interval. Accordingly, the lifespan of the second stochastic function corresponds to (i.e., equal to) the second time interval. Furthermore, as the second code is refreshed (or re-initialized) periodically, freshness or unpredictability of the second series of unique random sequences generated at the second functional block (which is generated based on the second code) for deobfuscating the obfuscated address can be achieved.

In various embodiments, as the first code and the second code are the same (e.g., at the effective transmitting time and the effective receiving time, respectively), the first stochastic function at the first functional block and the second stochastic function at the second functional block are initialized (at corresponding time instances subject to the time latency) based on the same code. As a result, with the first code and the second code being the same, the first stochastic function and the second stochastic function generate the same random sequence, that is, the first random sequence and the second random sequence generated are the same (at corresponding time instances subject to the time latency).

In various embodiments, the above-mentioned first stochastic function is configured to generate the first random sequence and the second stochastic function is configured to generate the second random sequence in a manner that is time-dependent, deterministic and cyclic.

In various embodiments, the first and second input clock signals are based on a common clock source.

In various embodiments, the above-mentioned obfuscating (at 208), at the first functional block, the address associated with the communication is completed within a communication latency time. In various embodiments, the communication latency time refers to the total time taken for the communication (e.g., associated data) to be transmitted from a transmitting host (e.g., corresponding to the first functional block) to a receiving host (e.g., corresponding to the second functional block). For example, the communication latency time may be measured in terms of the number of clock cycles.

In various embodiments, the method 200 further comprises: encoding, at the first functional block, the obfuscated address to produce an encoded address; and decoding, at the second functional block, the encoded address to produce the obfuscated address. In various embodiments, the above-mentioned transmitting (at 210), at the first functional block, the obfuscated address to the second functional block comprises transmitting the encoded address including the obfuscated address to the second functional block. In various embodiments, the above-mentioned receiving (at 212), at the second functional clock, the obfuscated address from the first functional block comprises receiving the encoded address including the obfuscated address from the first functional block. Accordingly, the address associated with the communication is further protected or secured, such as enhancing the avalanche effect in the previous obfuscation step (obfuscating the address), thus further enhancing communication security (e.g. privacy) in the SoC.

In various embodiments, the above-mentioned encoding, at the first functional block, the obfuscated address comprises encoding the obfuscated address based on a first substitution-permutation network comprising a substitution box function and a permutation box function. In various embodiments, the above-mentioned decoding, at the second functional block, the encoded address to produce the obfuscated address comprises decoding the encoded address based on a second substitution-permutation network comprises an inverse substitution box function and an inverse permutation box function.

In various embodiments, the above-mentioned encoding, at the first functional block, the obfuscated address is selectively enabled. In various embodiments, the above-mentioned decoding, at the second functional block, the encoded address is selectively enabled. That is, such an encoding of the obfuscated address may be selectively enabled or disabled. Similarly, such a decoding of the encoded address may be selectively enabled or disabled.

Accordingly, various embodiments advantageously provide flexibility in selecting a mode or level of communication security, such as depending on the level of security required or desired for the communication.

It will be appreciated by a person skilled in the art that steps recited in the method 200 are not limited to being performed in the order presented (e.g., as presented in FIG. 2), and may be performed or executed any suitable or appropriate order. For example, although the step 208 of obfuscating, at the first functional block, an address associated with the communication may be shown in FIG. 2 as being after the step 206 of generating, at the second functional block, a second code, it will be appreciated by a person skilled in the art that the step 206 of generating the second code may be performed after the step 208 of obfuscating the address, since the second code may be generated after the address is obfuscated, such as at the effective receiving time of the communication.

Figure 3:
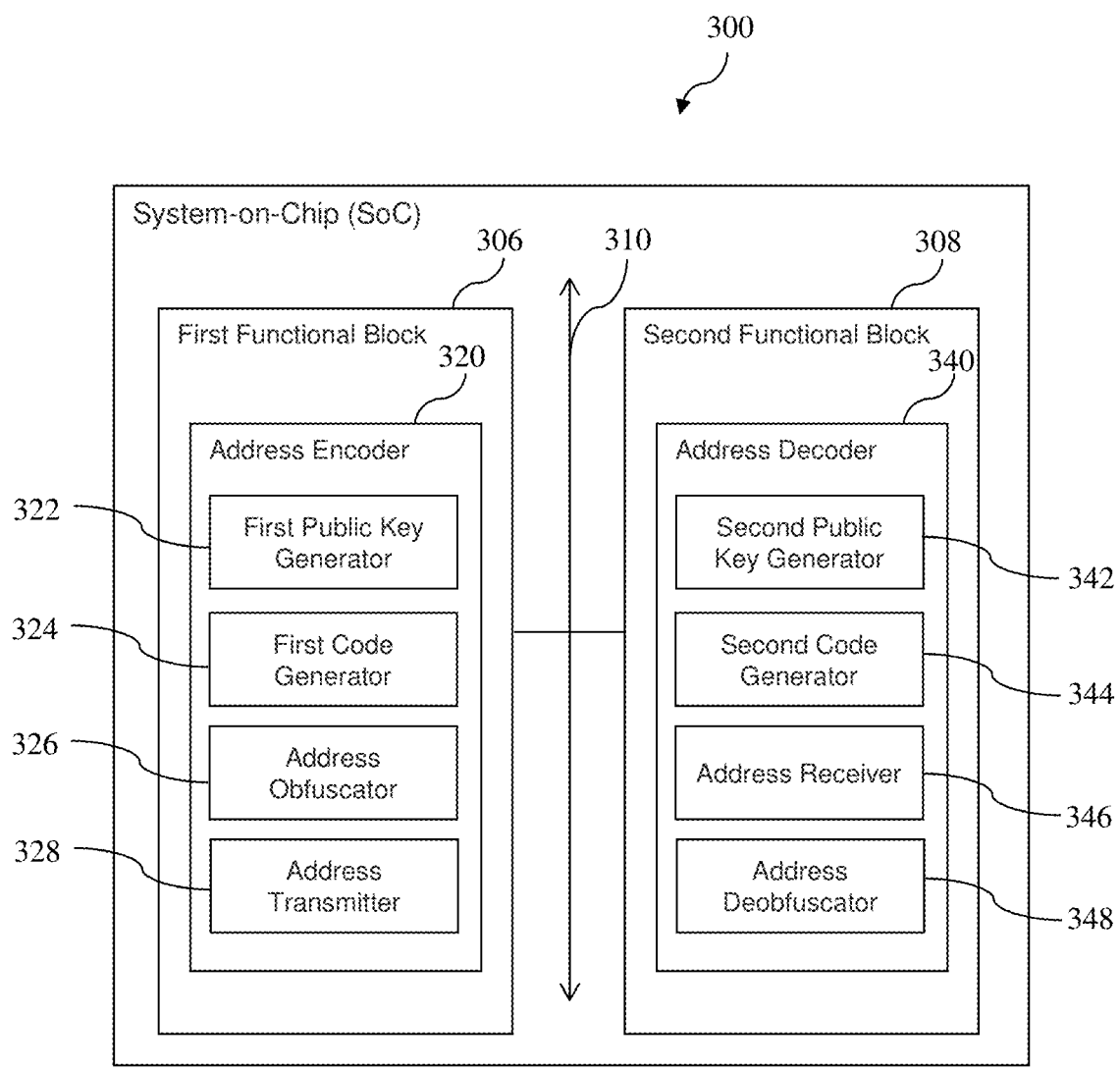
FIG. 3 depicts a schematic block diagram of a SoC, according to various embodiments of the present invention.

FIG. 3 depicts a schematic block diagram of a system-on-chip (SoC) 300 according to various embodiments of the present invention. In particular, the SoC 300 is configured such that communication between functional blocks in the SoC 300 is performed or carried out in a manner as described in the method 200 of communication between functional blocks in the SoC as described hereinbefore with reference to FIG. 2 according to various embodiments of the present invention. Accordingly, the SoC 300 may be referred to as a SoC with enhanced communication security.

The SoC 300 comprises a first functional block 306; and a second functional block 308 communicatively coupled to the first functional block 306 via an interconnect communication infrastructure 310. The first functional block 306 comprises an address encoder (or addressing encoding circuit or module) 320, the address encoder 320 comprising: a first public key generator (or first public key generating circuit or module) 322 configured to exchange a public key with the second functional block 308 for a communication between the first functional block 306 and the second functional block 308, the first functional block 306 being a transmitter of the communication and the second function block 308 being a receiver of the communication; a first code generator (or first code generating circuit or module) 324 configured to generate a first code based on the public key of the second functional block; an address obfuscator (or address obfuscating circuit or module) 326 configured to obfuscate an address associated with the communication based on the first code to produce an obfuscated address; and an address transmitter (or address transmitting circuit or module) 328 configured to transmit the obfuscated address to the second functional block 308 via the interconnect communication infrastructure 310 in the SoC 300. The second functional block 308 comprises an address decoder (or address decoding circuit or module) 340, the address decoder 340 comprising: a second public key generator (or second public key generating circuit or module) 342 configured to exchange a public key with the first functional block 306 for the communication; a second code generator (or second code generating circuit or module) 344 configured to generate a second code based on the public key of the first functional block; an address receiver (or address receiving circuit or module) 346 configured to receive the obfuscated address from the first functional block via the interconnect communication infrastructure; and an address deobfuscator (or address deobfuscator circuit or module) 348 configured to deobfuscate the obfuscated address received based on the second code to produce a deobfuscated address associated with the communication.

It will be appreciated by a person skilled in the art that the first functional block 306 and the second functional block 308 may refer to any two functional blocks in the SoC that want to communicate (e.g., instructed to communicate) with each other, such as for transferring data. Such two functional blocks may also be referred to as two communicating functional blocks. That is, for any two functional blocks that want to communicate with each other, the transmitter of the communication may be referred to a first functional block and the receiver of the communication may be referred to as a second functional block. Accordingly, it will be appreciated by a person skilled in the art that the present invention is not limited to any two particular functional blocks in the SoC, and may be any two functional blocks in the SoC that want to communicate with each other.

In various embodiments, each functional block in the SoC that may transmit a communication to another functional block in the SoC may be configured to include the address encoder 320 as described herein according to various embodiments. In various embodiments, each functional block in the SoC that may receive a communication from another functional block in the SoC may be configured to include the address decoder 340 as described herein according to various embodiments. Accordingly, each SoC that may transmit a communication to another functional block in the SoC and may receive a communication from another functional block in the SoC may be configured with both the address encoder 320 and the address decoder 340. Accordingly, in various embodiments, a plurality of the functional blocks in the SoC (e.g., each functional block in the SoC) are each configured with both the address encoder 320 and the address decoder 340.

It will be appreciated by a person skilled in the art that the modules of the address encoder 320 and the modules of the address decoder 340 described above may be implemented as software (or functional) modules or hardware modules, or a combination of hardware and software modules, as desired or as appropriate.

For software modules, it will be appreciated by a person skilled in the art that the associated steps or functions described herein may be put into effect by a computer program (computer code). The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the scope of the present invention. Accordingly, it will be appreciated by a person skilled in the art that one or more of the modules described herein (e.g., the first public key generator 322, the first code generator 324, the address obfuscator 326, the address transmitter 328, the second public key generator 342, the second code generator 344, the address receiver 346, and/or the address deobfuscator 348) may be software module(s) realized by computer program(s) or set(s) of instructions executable by a computer processor to perform the corresponding functions/operations described herein according to various embodiments. Accordingly, it will be appreciated by a person skilled in the art that one or more processors may be configured to perform functions/operations through set(s) of instructions (software modules) executable by the one or more processors. It will be appreciated by a person skilled in the art that one or more memories (e.g., memory units or devices) may be provided having stored therein one or more of the software modules. For example, a memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory). Furthermore, one or more of the steps of a computer program or method described herein may be performed in parallel rather than sequentially.

For hardware modules, it will be appreciated by a person skilled in the art that the associated steps or functions described herein may be put into effect by functional hardware unit(s) designed to perform the corresponding functions/operations described herein according to various embodiments. For example, a module may be implemented using discrete electronic components, or it can form a portion of an entire electronic circuit such as an Application Specific Integrated Circuit (ASIC).

It will be appreciated by a person skilled in the art that the above-mentioned modules are not necessarily separate modules, and two or more modules may be realized by or implemented as one functional module (e.g., a circuit or a software program) as desired or as appropriate without deviating from the scope of the present invention. By way of an example only and without limitation, for the address encoder 320, two or more of the first public key generator 322, the first code generator 324, the address obfuscator 326 and the address transmitter 328 may be realized (e.g., compiled together) as one executable software program (e.g., software application or simply referred to as an "app"), which for example may be stored in a memory and executable by at least one processor to perform the corresponding functions/operations as described herein according to various embodiments. Similarly, two or more of the second public key generator 342, the second code generator 344, the address receiver 346 and the address deobfuscator 348 may be realized (e.g., compiled together) as one executable software program. It will be appreciated that a combination of hardware and software modules may be implemented.

In various embodiments, the SoC 300 corresponds to the method 200 as described hereinbefore with reference to FIG. 2, therefore, various functions or operations configured to be performed by the SoC 300 may correspond to various steps or functions of the method 200 described hereinbefore according to various embodiments, and thus need not be repeated with respect to the SoC 300 for clarity and conciseness. In other words, various embodiments described herein in context of the methods are analogously valid for the corresponding SoC 300, and vice versa. In particular, the SoC 300 is configured such that communication between functional blocks in the SoC 300 is performed or carried out in a manner as described in the method 200 of communication between functional blocks in the SoC as described hereinbefore according to various embodiments.

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g., a microprocessor (e.g., a Complex Instruction Set Computer (CISC) processor or a Reduced Instruction Set Computer (RISC) processor). A "circuit" may also be a processor executing software, e.g., any kind of computer program, e.g., a computer program using a virtual machine code, e.g., Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "exchanging", "generating", "obfuscating", "transmitting", "receiving", "deobfuscating", "encoding", "decoding" or the like, refer to the actions and processes of a computer system, or similar electronic device, that manipulates and transforms data represented as physical quantities within the computer system into other data similarly represented as physical quantities within the computer system or other information storage, transmission or display devices.

Figure 4:
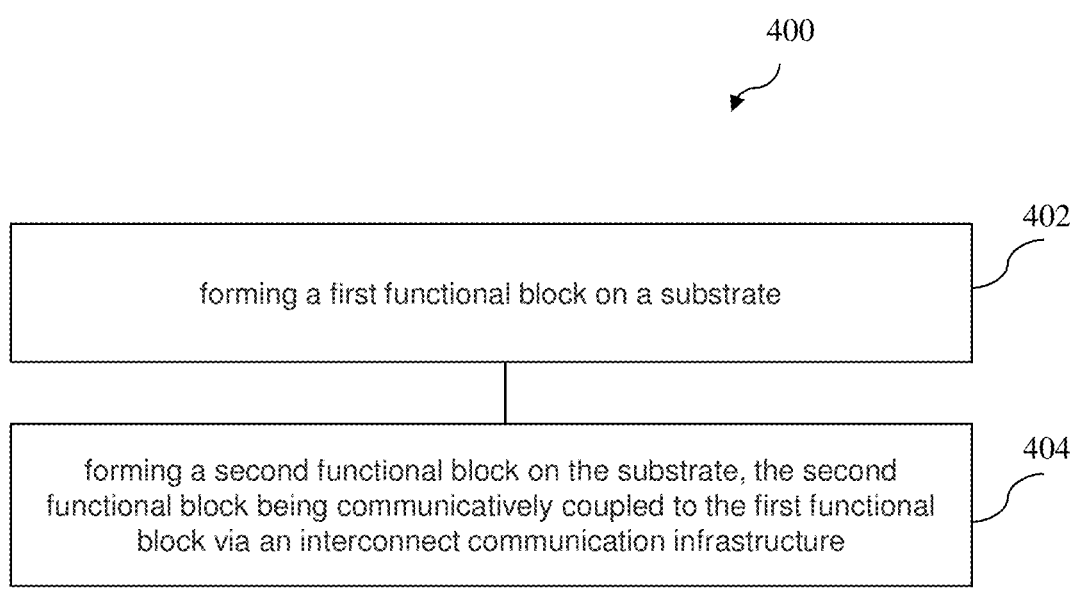
FIG. 4 depicts a schematic flow diagram of a method of forming a SoC, according to various embodiments of the present invention.

FIG. 4 depicts a flow diagram of a method 400 of forming a SoC according to various embodiments of the present invention, such as the SoC 300 as described herein according to various embodiments of the present invention. The method 400 comprises: forming (at 402) a first functional block on a substrate; and forming (at 404) a second functional block on the substrate, the second functional block being communicatively coupled to the first functional block via an interconnect communication infrastructure. In particular, the first functional block comprises an address encoder, the address encoder comprising: a first public key generator configured to exchange a public key with the second functional block for a communication between the first functional block and the second functional block, the first functional block being a transmitter of the communication and the second function block being a receiver of the communication; a first code generator configured to generate a first code based on the public key of the second functional block; an address obfuscator configured to obfuscate an address associated with the communication based on the first code to produce an obfuscated address; and an address transmitter configured to transmit the obfuscated address to the second functional block via an interconnect communication infrastructure in the system-on-chip. Furthermore, the second functional block comprises an address decoder, the address decoder comprising: a second public key generator configured to exchange a public key with the first functional block for the communication; a second code generator configured to generate a second code based on the public key of the first functional block; an address receiver configured to receive the obfuscated address from the first functional block via the interconnect communication infrastructure; and an address deobfuscator configured to deobfuscate the obfuscated address received based on the second code to produce a deobfuscated address associated with the communication.

It will be appreciated by a person skilled in the art that the present invention is not limited to forming the above-mentioned first and second functional blocks on the substrate, and additional functional blocks (e.g., each having the above-mentioned address encoder and/or the address decoder) may be formed on the substrate, so as to configure the SoC to perform one or more practical applications, as desired or as appropriate. That is, the SoC may be formed to have any number of functional blocks integrated therein as desired or as appropriate, and a plurality of the functional blocks (e.g., each functional block) formed in the SoC may each be configured with the above-mentioned address encoder and/or the address decoder.

Techniques for forming SoC are well known in the art, and thus need not be described herein for clarity and conciseness. By way of an example only and without limitation, SoC may be formed or fabricated based on metal-oxide-semiconductor (MOS) technology.

In various embodiments, similar to the SoC 300 described hereinbefore, the SoC 300 formed by the method 400 corresponds to the method 200 as described hereinbefore with reference to FIG. 2, therefore, various functions or operations configured to be performed by the SoC 300 formed by the method 400 may correspond to various steps or functions of the method 200 described hereinbefore according to various embodiments, and thus need not be repeated with respect to the SoC 300 formed for clarity and conciseness. In other words, various embodiments described herein in context of the method 200 are analogously valid for the corresponding SoC 300 formed by the method 400, and vice versa. In particular, the SoC 300 formed by the method 400 is configured such that communication between functional blocks in the SoC 300 formed is performed or carried out in a manner as described in the method 200 of communication between functional blocks in the SoC as described hereinbefore according to various embodiments.

It will be appreciated by a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present invention will be described hereinafter by way of examples only and not limitations. It will be appreciated by a person skilled in the art that the present invention may, however, be embodied in various different forms or configurations and should not be construed as limited to the example embodiments set forth hereinafter. Rather, these example embodiments are provided so that this disclosure will be thorough and complete, and will fully convey the scope of the present invention to those skilled in the art.

As described in the background, the wide diversity of computational requirements across different micro-architecture elements in the SoC tends to leak the side channel information (e.g., power consumption and timing latency) of the underlying hardware when the communications take place. While the confidentiality and the integrity of the sensitive data can be protected via encryption and authentication, the access addresses (i.e., destination addresses) upon communication are transmitted plainly across the system's interconnections.

Several Side-channel Attacks (SCA), such as timing attack, power-monitoring attack and cache attack, may make use of the communication patterns to reveal the reused code during the program execution and to leak the critical data, such as the cryptographic keys. This communication pattern refers to, in particular, the address sequence stream and the frequency of the repetitive communications between the computational blocks.

State-of-the-art obfuscation techniques reported in the literature are mainly based on the Oblivious RAM (ORAM), such as the Path ORAM and its variants. These solutions work by inferring excessive dummy accesses such that the location is reshuffled after each access. Though such mechanism effectively hides the real access patterns, its implementations on hardware is impractical and suffers from overheads in terms of storage capacity, communication latency and with the possibility of system deadlock. Thus, ORAM inspired obfuscation are commonly deployed as a software solution, such as for a server-client environment. On the other hand, the existing hardware-based obfuscation mechanism (with and without ORAM semantics) are specifically designed and customized for memory access pattern obfuscation.

Therefore, various example embodiments provide a lightweight and efficient obfuscation method or technique (e.g., corresponding to the method of communication between functional blocks as described hereinbefore according to various embodiments) that provides privacy and trusted communication, while meeting system design's requirements. For illustration purpose only and without limitation, various features and characteristics of the obfuscation method according to various example embodiments are compared and contrasted with the conventional techniques, and are summarized in the table shown in FIG. 5. In particular, FIG. 5 depicts a table showing example comparisons between conventional ORAM-based designs and the communication pattern obfuscation (lightweight communication obfuscation) design according to various example embodiments of the present invention.

For better understanding, an example obfuscation method or architecture (e.g., corresponding to the method of communication between functional blocks as described hereinbefore according to various embodiments) according to various example embodiments will now be described below.

1. Example Architecture Design

Figure 6:
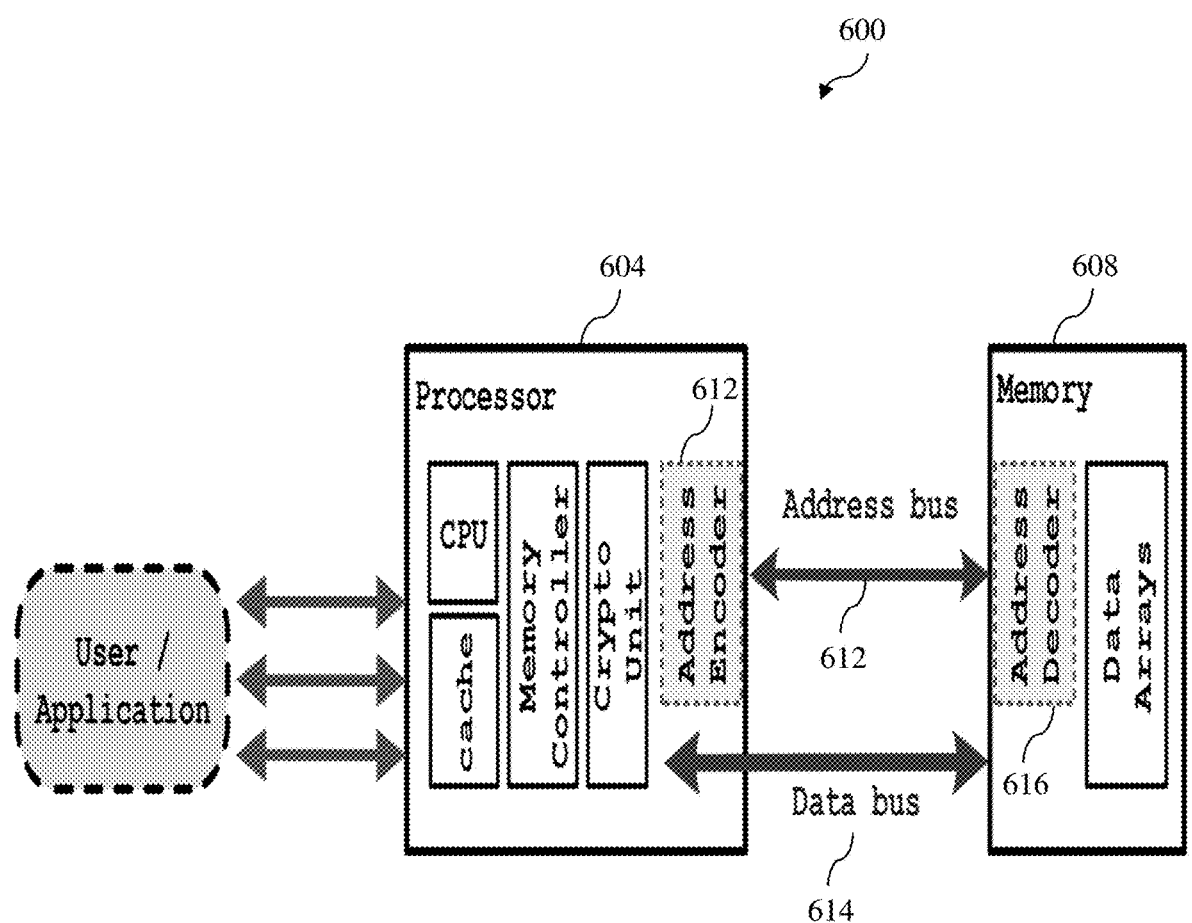
FIG. 6 depicts a schematic drawing illustrating an example communication between two functional blocks, according to various example embodiments of the present invention.

According to various example embodiments, an example obfuscation method is provided involving two main components or units, namely, an address encoder embedded or integrated in the transmitting host (e.g., corresponding to the "first functional block" described hereinbefore according to various embodiments) and an address decoder embedded or integrated in the receiving host (e.g., corresponding to the "second functional block" described hereinbefore according to various embodiments). An example top level architecture of an example system application 600 employing the example obfuscation method is shown in FIG. 6. In particular, FIG. 6 depicts a schematic drawing illustrating an example communication between a first functional block (e.g., an on-chip processor) 604 and a second functional block (e.g., a memory device) 608. As shown in FIG. 6, the first functional block 604 comprises an address encoder 612 configured to obfuscate an address (i.e., destination address) of the communication, and the second functional block 608 comprises an address decoder 616 configured to deobfuscate the obfuscated address of the communication received from the first functional block 604, thus advantageously protecting or securing the address of the communication, thereby enhancing communication security. As shown in FIG. 6, the obfuscated address may be transmitted from the first functional block 604 to the second functional block 608 via an address bus 612, and the data associated with the communication may be transmitted from the first functional block 604 to the second functional block 608 via a data bus 614.

Figure 7:
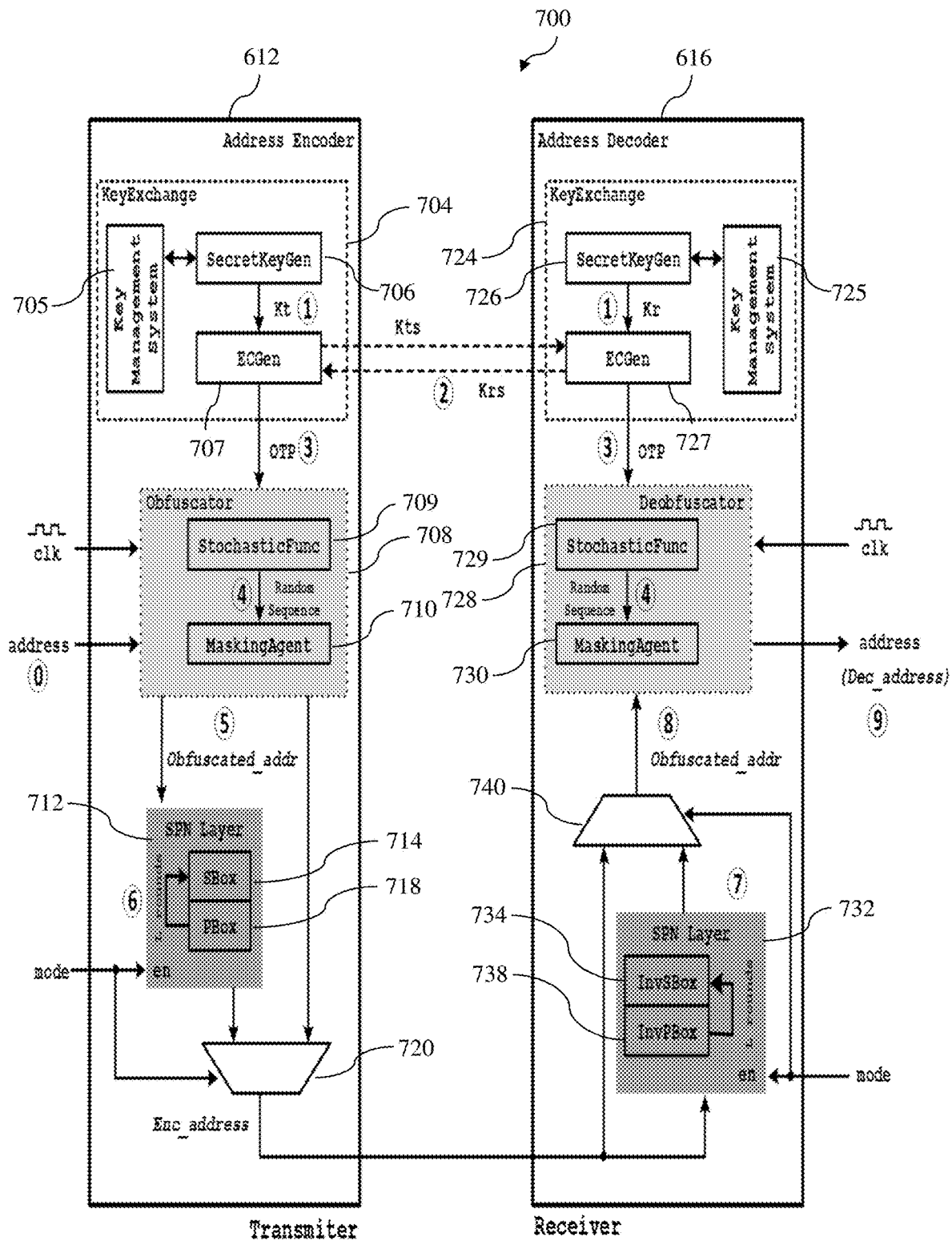
FIG. 7 depicts an example obfuscation architecture for a communication between two functional blocks, according to various example embodiments of the present invention.

According to various example embodiments, main computational features and building blocks in the address encoder 612 and the address decoder 616 are shown in FIG. 7 and will be described in further details below. In particular, FIG. 7 depicts an example obfuscation architecture 700 for the communicating hosts (that is, for the first functional block (being a transmitter of the communication) and the second functional block (being a receiver of the communication)). As shown in FIG. 7, the address encoder 612 in the transmitting host may comprise a first key exchanger (or first key exchanging module or circuit) 704, an address obfuscator (or address obfuscating module or circuit) 708, and an encoder (or encoding module or circuit) 712. The address decoder 616 in the receiving host may comprise a second key exchanger (or second key exchanging module or circuit) 724, an address deobfuscator (or address deobfuscating module or circuit) 728, and a decoder 732.

1.1 Key Exchange Infrastructure

In various example embodiments, a key exchange infrastructure may be provided in each of the address encoder 612 and the address decoder 616, such as in the form of a first key exchanger 704 and a second key exchanger 724, respectively. The first key exchanger 704 and the second key exchanger 724 may be configured to establish an initial handshake between the communicating hosts, such as to exchange their public keys and timing information (e.g., time latency between the first key exchanger 704 and the second key exchanger 724). In various example embodiments, each communicating host may have at least two keys, namely, its own secret key and the shared public key (i.e., the public key shared by or received from the other communicating host). Accordingly, the first key exchanger 704 of the transmitting host may store at least its own secret key $\{K_t\}$ and the public key $\{K_{rs}\}$ shared by the receiving host, and the second key exchanger 724 of the receiving host may store at least its own secret key $\{K_r\}$ and the public key $\{K_{ts}\}$ shared by the transmitting host. The first key exchanger 704 and the second key exchanger 724 may each be configured to generate a code (e.g., a one-time password (OTP)) (e.g., corresponding to the "first code" and "second code", respectively, described herein according to various embodiments) that is used as an initial seed to the stochastic function in the corresponding communicating host.

In various example embodiments, the first key exchanger 704 and the second key exchanger 724 may each comprise the following components.

First Block—Key Management System 705/725: A secure on-chip entity that is responsible in administrating the usage of secret keys. The key management system 705/725 may be configured to manage or store timing information (e.g., time latency between the first key exchanger 704 and the second key exchanger 724) relating to the communication.

Second Block—Secret Key Generator (SecretKeyGen) 706/726: An unclonable/unreplicable function configured to produce unique IDs which are used as the hosts' secret key $\{K_t, K_r\}$. By way of examples only and without limitation, this function may be implemented in the form of physical unclonable function (PUF), true random number generation (TRNG), or digital fingerprint. In various example embodiments, the implementation on both communicating hosts need not be the same.

Third Block—Code Generator 707/727, such as in the form of an Elliptic Curve Generator (ECGen): A mathematical model configured to generate a public key $\{K_{ts}, K_{rs}\}$ based on the properties of elliptic curve (EC) equations without revealing the secret key $\{K_t, K_r\}$. After exchanging the public keys between the communicating hosts, a code (e.g., an OTP) may be subsequently computed. In this regard, the code generator 707/727 may be configured to generate both the public key and the code. That is, a public key may first be generated using the secret key, then after an exchange of public keys, a code may subsequently be generated using its secret key and the received shared public key.

In various example embodiments, the code (e.g., an OTP) generated by the code generator 707/727 satisfies the following criteria:

- computed using its secret key and the shared public key. That is, the code generator 707 in the address encoder 612 may be configured to generate the code using the secret key $\{K_t\}$ of the transmitting host and the public key $\{K_{rs}\}$ of the receiving host (i.e., the shared public key received from the receiving host). Correspondingly, the code generator 727 in the address decoder 616 may be configured to generate the code using the secret key $\{K_r\}$ of the receiving host and the public key $\{K_{ts}\}$ of the transmitting host (i.e., the shared public key received from the transmitting host);
- remain unknown to external;
- width of N-bits, where N is an integer divisible by the address' bit-length. By way of example only and without limitation, choices of N may be 32, 64, or 128 for address length of 32-bits;
- identical at both sides (i.e., the transmitting and receiving hosts) at time nT (e.g., the effective transmitting time) and time n(T+l) (e.g., the effective receiving time), respectively, where n is an integer and/is the time latency (between the transmitting and receiving hosts); and
- refreshed at every T time, which is the lifespan of the stochastic function component.

In various example embodiments, both the first key exchanger 704 and the second key exchanger 708 may be implemented using hardware digital logic circuits.

1.2 Obfuscator Infrastructure

In various example embodiments, an obfuscator infrastructure is provided in each of the address encoder 612 and the address decoder 616, such as in the form of an address obfuscator 708 and an address deobfuscator 728, respectively. The address obfuscator 708 and the address deobfuscator 728 may each be configured to generate highly random and uncorrelated sequences that varies at every time step t. The address obfuscator 708 and the address deobfuscator 728 may each be initialized with the respective code (e.g., OTP) generated from the corresponding key exchange infrastructure. The address obfuscator 708 may be configured to mask the plain address upon every communication and the address deobfuscator 728 may be configured to unmask the obfuscated address upon every communication. In various example embodiments, this process is completed within a communication latency time, that is, the whole process of obfuscating to deobfuscating the address is completed within the communication latency time. In other words, the address obfuscation and deobfucation process is advantageously performed in the background when the communication is taking place.

In various example embodiments, the address obfuscator 708 and the address deobfuscator 728 may each comprise the following components.

First Block—Stochastic Function (StochasticFunc) Module 709/729 (which may also be referred to as a Random Sequence Generator): The stochastic function module 709/729 may be configured to execute a stochastic function. A transformation that is generalized for any number of cycles, p, which can be defined as: $S(t+p)=T^p \cdot S(t)$ where T is the transformation matrix, S(t) and S(t+1) are the states of the p-time difference (clock cycles). In fulfilling the criteria above, the stochastic function may be configured to generate a collection of $2^n-1$ cyclic unique binary states that represents all the elements of particular Galois field $GF(2^n)$ defined by its field primitive polynomial P(x). For instance, given a is the primitive element of the field $GF(2^n)$, all the non-zero elements in the field may be generated by successive multiplication with a such as shown below. Upon reaching the maximum length (running at $2^n-1$ cycles, it may return back to the initial state.

$$\alpha^0, \alpha^1, \alpha^2, \ldots, \alpha^{2^{N-2}}; \alpha^{2^{N-1}} = \alpha^0 = 1 \quad \text{Equation (1)}$$

Second Block—Masking Agent 710/730 (which may also be referred to as a randomizer): A simple model that integrates the random sequence from the stochastic function module 709/729 with the plain address. By way of examples only and without limitation, the masking agent 710/730 may be implemented using a single logic gate (e.g., XOR and XNOR in the masking agent 710 and the masking agent 730, respectively), a simple arithmetic function (e.g., adder and subtractor in the masking agent 710 and the masking agent 730, respectively) or a complicated (but linear) higher order pair of function (e.g., derivative and integral in the masking agent 710 and the masking agent 730, respectively).

In various example embodiments, the stochastic function module 709/729 at the address encoder 612 and the address decoder 616 satisfies the following criteria:

initialized with same code (e.g., OTP) at both the transmitting and receiving hosts. In other words, the stochastic function at the address encoder 612 and the stochastic function at the address decoder 616 are synchronous and initialized using the same code at the effective transmitting time and the effective receiving time, respectively, of a communication. In this regard, in various example embodiments, the stochastic function module 709 and the stochastic function module 729 may be refreshed (that is, initialized and re-initalized with the code) at different time latency, which may be configured or varied based on, for example, a selected security mode.

Figure 8:
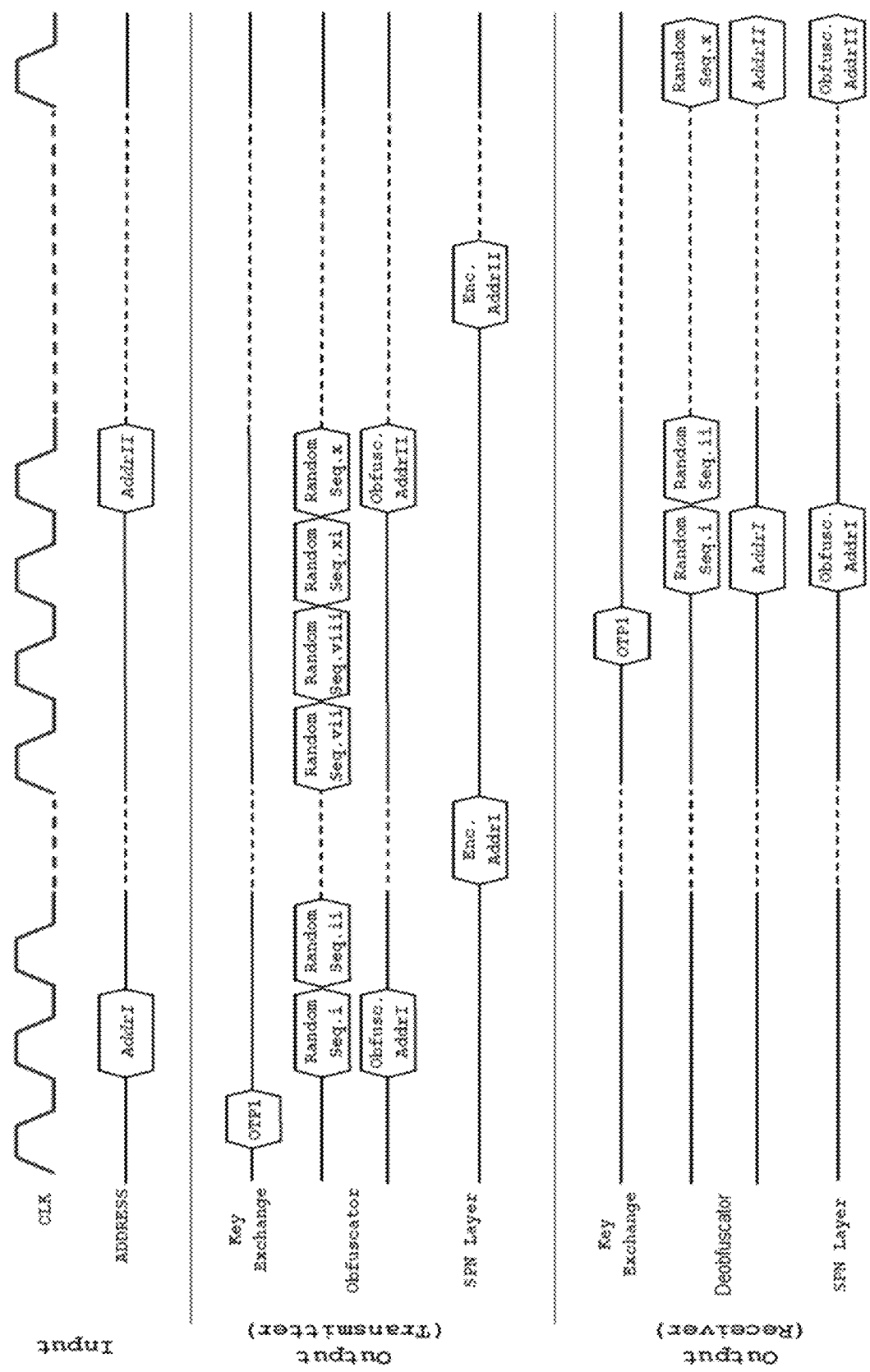
FIG. 8 depicts an example timing diagram illustrating operations at the address encoder and the address decoder, subject to a time latency between the address encoder and address decoder, according to various example embodiments of the present invention.

That is, there is a time delay between the same code generated by the code generator 727 at the address decoder 616 with respect to the code generated by the code generator 707 at the address encoder, such that at the effective transmitting time and the effective receiving time of a communication, the code generated by the code generator 707 at the address encoder 612 and the code generated by the code generator 727 at the address decoder 616, respectively, are the same. For example, the security mode may be selected based on the need of the applications running on the embedded processor or the CPU in the communicating hosts. Prior to any communication establishment, both the transmitting and the receiving hosts may agree on various communication parameters, such as (i) security mode/level of the communication, (ii) refresh rate of the code (e.g., the OTP), and (iii) the time latency due to the SPN layer 712/732 (if enabled). In various example embodiments, the above-mentioned information (which may be referred to as timing information herein) may be exchanged between the communicating hosts as part of the communication handshaking protocol between the communicating hosts. In various example embodiments, the key management system 705 and the key management system 725 may be configured to manage or store the timing information. For example, based on the timing information received from the first key exchanger 704 of the transmitting host, the key management system 725 of the receiving host may be configured to determine the time latency (time delay) of the receiving host (in particular, the code generator 727) with respect to the transmitting host (in particular, the code generator 707), such that the code generator 727 is configured or scheduled to produce the same code (e.g., OTP) at the effective receiving time as the code generated by the code generator 727 at the effective receiving time. By way of example only and without limitation, consider the communication establishment for high security mode, the code (e.g., OTP) refresh or generation rate is 100 time unit and the time latency from the SPN layers 712 and 732 is 20 time unit. Based on this example, the key management system 705 on the transmitting host may control the code to be generated or refreshed at the agreed rate, which means, at t=0, 100, and so on. Based on the above timing information received from the transmitting host, the key management system 725 at the receiving host may control the code to be generated or refreshed at the agreed rate adjusted or modified by the time latency (20 time unit) due to the SPN layers 712 and 732, that is, at t=20, 120, and so on.

generate the same random sequence on both the transmitting and receiving hosts, subject to a time latency between the transmitting and receiving hosts as described hereinbefore. Upon every initialization (and subsequent re-initialization) with the code (OTP), the stochastic function 709/729 generates a series of random sequences where each generated random sequence is different (or updated) at every clock cycle. By way of an example for illustration purpose only, FIG. 8 depicts a timing diagram illustrating operations at the transmitting and receiving hosts, subject to a time latency between the transmitting and receiving hosts. In particular, FIG. 8 depicts the generation of a series of random sequences at the transmitting host (as well as the obfuscation of a first address (Address I) with a first random sequence (Random Sequence i) and a second address (Address II) with a second random sequence (Random Sequence x)) and the generation of a series of random sequences at the receiving host (as well as the deobfuscation of the obfuscated first address (Address I) with the same first random sequence (Random Sequence i) and the obfuscated second address (Address II) with the same second random sequence (Random Sequence x)), subject to a time latency between the transmitting and receiving hosts. In the example of FIG. 8, the time latency may be the difference in time between the generation of the code (e.g., OTP1) at the transmitting host and the generating of the same code (e.g., OTP1) at the receiving host, that is, between the effective transmitting time and the effective receiving time. As shown in FIG. 8, the series of random sequences generated by the code generator 727 at the receiving host based on the code (OTP1) (generated at a later time based on the time latency) is the same as the series of random sequences generated by the code generator 707 at the transmitting host based on the same code (OTP1). Accordingly, the series of the random sequences generated (upon every OTP refresh) are identical on both the stochastic function module 709 and the stochastic function module 729 (subject to a time latency). In various example embodiments, the time latency between the random sequences generated by the transmitting and the receiving hosts may be based on the selected security mode. For example, in the address obfuscator 708 at time t=1, a random sequence R1 is generated and masked with address A1 to obtain an obfuscated address O1. In a high security mode, with L=8 (in the SPN layers 712/732), the obfuscated address O1 is reflected at time t=21 on the receiving host. In this regard, in order to successfully deobfuscate the address obfuscated by the transmitting host to retrieve the original address, the random sequence generated at the address deobfuscator 728 at time t=21 is the same random sequence R1 as that generated in the address obfuscator 708 at time t=1. In other words, in this example, the stochastic function module 729 at the receiving host is configured to generate the same random sequences as stochastic function module 709 at the transmitting host with a 20-unit time latency for the communication therebetween. Furthermore, as the SPN layers 712 and 732 may be implemented as pure combinational circuit or sequential circuit (clocked), the actual time latency to complete the L round can be a single clock cycle (complete the computation in a single clock cycle) or multiple clock cycles. The actual time latency may also subjected to the speed of the clock that drives the SPN layers 712/732.

In various example embodiments, the time latency per L round may be determined during design phase and may be fixed upon implementation. Therefore, the timing information for the time latency per L round may be configured in the key management system 705 and the key management system 725. Upon the communication agreement between the communicating hosts, the key management system 705/725 may be configured to control the code (e.g., OTP) generation such that the same random sequence can be generated at corresponding time instances to obfuscate and deobfuscate the address successfully.

portray the characteristic of time-dependent, deterministic, cyclic and synchronous. In this regard, the stochastic function is a function of time, that is, the output of the stochastic function updates as a function of time (hence, time-dependent). The stochastic function generates the same series of random sequences given the same seed (e.g., corresponding to the code (e.g., OTP) described hereinbefore) (hence, deterministic). Furthermore, the generated series of random sequences form a cyclic group and the pattern (series of random sequences) repeats within the group (hence, cyclic). synchronized in both transmitting and receiving hosts. For example, in the case of on-chip or on-board communications, a shared clock source may be employed. For wireless communication, other forms of timing and carrier synchronization may be used to facilitate this feature.

the lifespan is restricted to a time interval T. Upon the expiry of the time interval T, the stochastic function may be re-initialized with a new code (e.g., OTP) to ensure the freshness of the generated randomized sequences.

In various example embodiments, both the address obfuscator 708 and the address deobfuscator 728 are implemented as hardware digital circuits, that is, for both the masking agent 710/730 and the stochastic function module 709/729. By way of examples only and without limitations, the stochastic function module 709/729 in the address obfuscator 708 and the address deobfuscator 728 may be implemented using a series of shift registers, such as Linear Feedback Shift Registers (LFSR) or Finite State Machine (FSM).

It will be appreciated by a person skilled in the art that the present invention is not limited to the manner in which the transmitting and receiving hosts (corresponding to the first and second functional blocks) are configured such that the codes (e.g., OTPs) generated are the same at corresponding time instances (e.g., at the effective transmitting time and the effective receiving time) with respect to a communication therebetween as described hereinbefore according to various example embodiments, or any other specific manner. In other words, as long as the transmitting and receiving hosts are configured such that the codes generated are the same at corresponding time instances with respect to a communication therebetween, it is within the scope of the present invention.

1.3 SPN Layer

In various example embodiments, a substitution-permutation network (SPN) layer 712/732 may be provided in each of the address encoder 612 and the address decoder 616. This cipher-inspired transformation layer is a lightweight and fast SPN with good cryptographic strength. For example, in the address encoder 612, the SPN layer 712 (e.g., may be referred to as an encoder and may correspond to the "encoder" configured to encode the obfuscated address described hereinbefore according to various embodiments) seeks to enhance the avalanche effect in obfuscation from the obfuscator infrastructure.

In various example embodiments, the SPN layer 712 in the address encoder 612 comprises the following components.

First Block—Substitution Box (SBox) 714: A non-linear substitution transformation that infers confusion and diffusion effects in the encoded data such that the output is drastically changed from its original form. In addition, a single bit change in the input will lead to major difference in the encoded output. Non-linearity can be achieved using multiplicative inversion over Galois field ($GF(2^N)$), where N is the data bitwidth or in the form of look-up table (LUT).

Second Block—Permutation Box (PBox) 718: A time-independent permutation function P subsequent to the SBox transformation. The output binary from SBox is permuted by moving bit i to position P(i).

In various example embodiments, the SPN layer 732 (e.g., may be referred to as a decoder and may correspond to the "decoder" configured to decode the encoded address described hereinbefore according to various embodiments) in the address decoder 616 comprises the following components.

First Block—Inverse Substitution Box (InvSBox) 734: Similar to Substitution Box (SBox), InvSBox is a non-linear transformation. In order to deduce the reversal of SBox in the address decoder, the reversal of multiplicative inversion over Galois field ($GF(2^N)$), where N is the data bitwidth or look-up table (LUT), may be used.

Second Block—Inverse Permutation Box (InvPBox) 738: Permutation reversal is performed in InvPBox to retrieve the position i from P(i) in PBox. It is a linear transformation where one-to-one (i from P(i)) mapping is performed. The function shares the same characteristic as Permutation PBox. It is a time-independent function subsequent to the InvSBox transformation.

In various example embodiments, the SPN layer 712/732 in the address encoder 612 and the address decoder 616 satisfies the following criteria:
  incorporated with the property of non-linearity;
  computation comes in pairs for the respective encoder/ decoder process;
  flexible to be enabled/disabled depending of the mode of security required in the communication;
  its implementation is a round-based architecture where the full round transformation is executed in one clock cycle. As such, the latency is equal to the number of execution rounds in SPN layer; and
  configurable number of rounds (L cycles) and must be within the hosts' communication access latency which is subjected to the interconnection technologies.

In various example embodiments, the address encoder 612 and the address decoder 616 may each further comprise an input selector 720/740 configured to select one of a plurality of inputs thereto for output therefrom based on a selection parameter. By way of an example only and without limitation, the input selector 720/740 may be implemented using a digital logic multiplexer. Accordingly, the address encoder 612 may further comprise a data selector 720 configured to select one of two inputs thereto, namely, a first input configured to receive the obfuscated address from the address obfuscator 708 and a second input configured to receive the encoded address from the encoder (e.g., the SPN layer) 712, based on an input mode (e.g., the security mode selected) and output the selected input. In other words, either the output from the address obfuscator 708 or the output from the encoder 712 is selected for output based on the input mode. Correspondingly, the address decoder 616 may further comprise an input selector 740 configured to select one of two inputs thereto, namely, a first input configured to receive the obfuscated address transmitted from the address encoder 612 and a second input configured to receive the encoded address from the decoder (e.g., the SPN layer) 732, based on an input mode (e.g., the security mode selected) and output the selected input. In other words, either the output from the address encoder 612 or the output from the decoder 732 is selected for output based on the input mode.

2 Operation and Timing Flow

Figure 9:
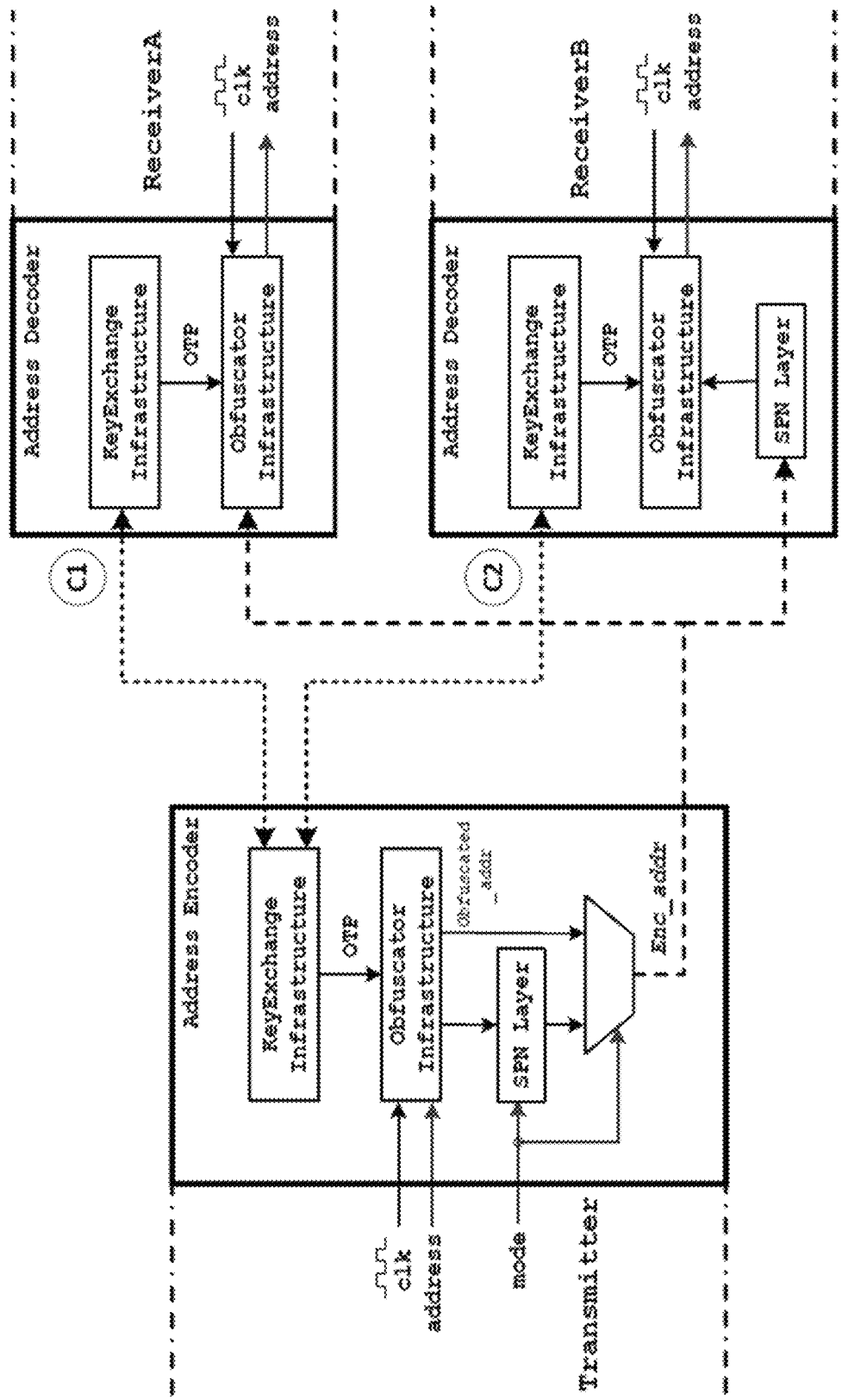
FIG. 9 depicts a schematic drawing illustrating two obfuscation security modes for a communication between two functional blocks, according to various example embodiments of the present invention.

In various example embodiments, the communication pattern obfuscation method is flexible in switching between two different security modes, that is, with or without the SPN layer (encoder/decoder 712/732) between different communicating hosts. An example scenario is as illustrated in FIG. 9. In particular, FIG. 9 depicts a schematic drawing showing two obfuscation security modes between communicating hosts. For example, for the example communication between the transmitter and receiver A in FIG. 9, the security mode is set to be on a first mode (e.g., corresponding to a default or standard security mode), that is, the SPN layer at the transmitter and the SPN layer at the receiver A are disabled. On the other hand, for the example communication between the transmitter and receiver B in FIG. 9, the security mode is set to be on a second mode (e.g., corresponding to an enhanced security mode or a high security mode), that is, the SPN layer at the transmitter and the SPN layer at the receiver B are enabled.

Figure 10:
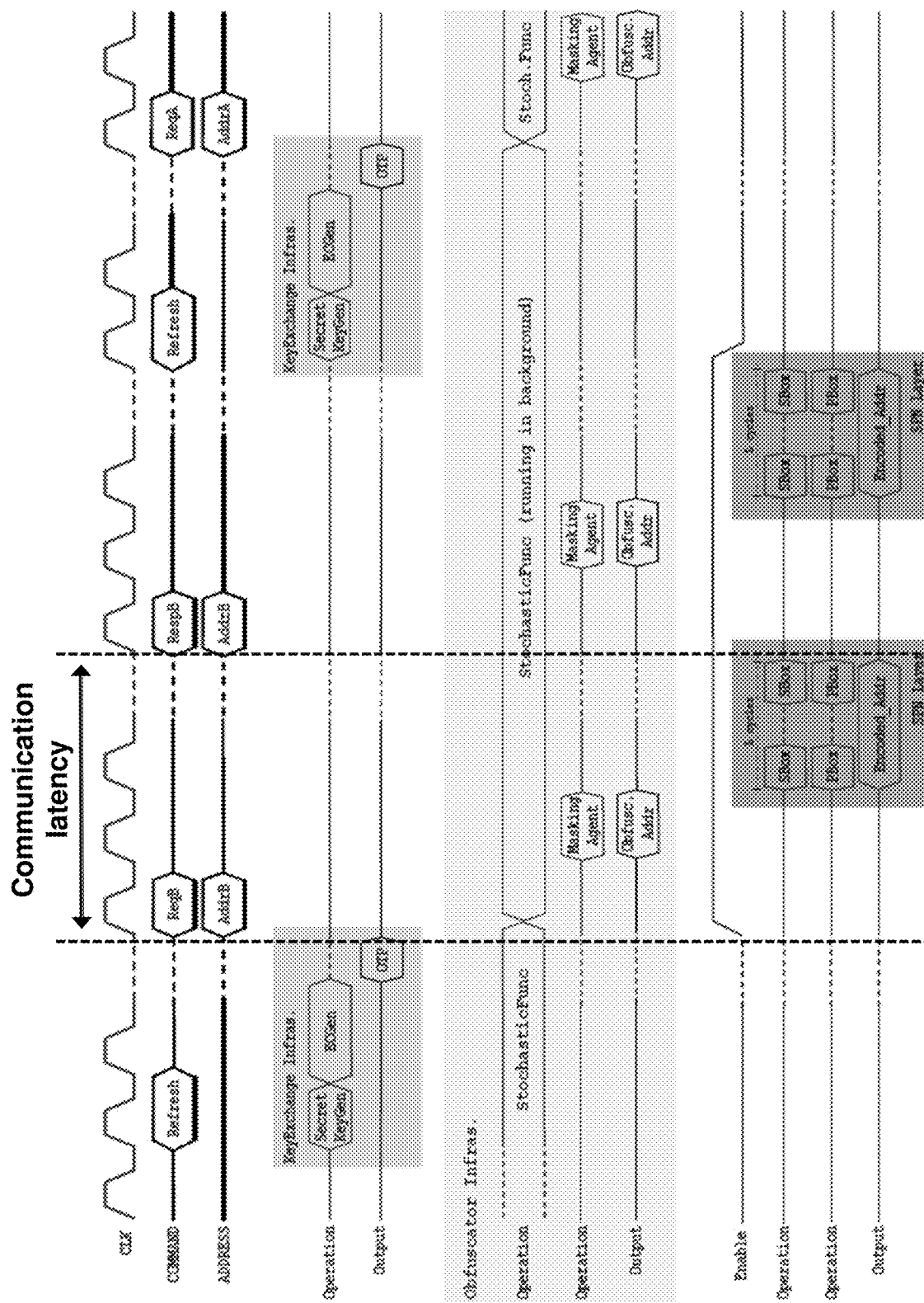
FIG. 10 depicts an example timing chart for transmission with obfuscation on a high security mode, according to various example embodiments of the present invention.

For better understanding, an example operational flow of the obfuscation operation or method running on a high security mode (i.e., with SPN layer 712/732 enabled) according to various example embodiments will now be described below with reference to FIG. 10, in conjunction with the example obfuscation architecture shown in FIG. 7. In particular, FIG. 10 depicts an example timing chart for transmission with obfuscation on a high security mode.

Step 1: REFRESH command is issued, which leads to the generation of the respective communicating hosts' secret key $\{K_t, K_r\}$ using the respective secret key generator (SecretKeyGen) 706/726.

Step 2: Public keys $\{K_{ts}, K_{rs}\}$ are derived and exchanged between the two communicating hosts using the respective elliptic curve generator (ECGen) 707/727.

Step 3: An one-time password (OTP) is derived at the transmitting host using the elliptic curve generator 707 and serves as a seed to initialize the obfuscator infrastructure 709 at the transmitting host.

Step 4: The stochastic function (StochasticFunc) module 709 at the transmitting host executes the stochastic function, which runs (in the background) synchronously with the clock, to generate a masking factor (a series of random sequences) throughout its lifespan per OTP.

Step 5: The masking agent (MaskingAgent) 710 at the transmitting host integrates the generated masking factor with the plain address to produce an obfuscated address (Obfuscated_addr).

Step 6: The obfuscated address (Obfuscated_addr) is transformed using SBox and PBox functions from the SPN layer 712 at the transmitting host to produce an encoded address (Enc_address), and the encoded address derived is transmitted to the receiving host.

Step 7: The received encoded address is first decoded using InvSBox and InvPBox functions from the SPN layer 732 to retrieve the obfuscated address (Obfuscated_addr).

Step 8: The masking agent 730 (MaskingAgent) disintegrates the masking factor from the obfuscated address (Obfuscated_addr) to obtain a deobfuscated address (Dec_address). For example, disintegration may be carried out by reversing the computation of the masking agent (integration of the masking factor) employed at the transmitting host. For example, logic gate XOR masking at the transmitting host can be unmasked with logic gate XNOR at the receiving host, and arithmetic adder masking at the transmitting host can be unmasked with arithmetic subtractor at the receiving host.

Based on the obfuscation method, the decoded and deobfuscated address obtained at the receiving host is the same plain address as the input address at the transmitting host.

Accordingly, a lightweight and hardware efficient obfuscation method is disclosed herein according to various example embodiments, which is practical for obfuscation communication pattern in the interconnect communication infrastructure (e.g., bus-based and network-based interconnection systems) across heterogeneous data communication traffic in a SoC.

Various example embodiments provide hardware-friendly cryptographical obfuscation solutions that achieve randomization in (i) the absolute location of the access and (ii) the distance of the address in between every communication (regardless of the actual distance). Furthermore, the obfuscation method may be scheduled within the access latency such that the communication overhead is retained at O(1). In addition, the obfuscation method also provides identity authentication check between the transmitter (host) and the receiver.

Accordingly, various example embodiments advantageously provide (i) a stochastic function that generates sequence with high entropy randomness factor and with or without (ii) a lightweight cipher-inspired transformation that infers fast substitution-permutation and achieving a substantially good avalanche effect.

Accordingly, various example embodiments may be applicable to embedding hardware with security feature on security data communication traffic. Various example embodiments may also be applicable to integration of open source CPUs on heterogeneous system, and to evaluate the design with different key length and implementation medium. For example, the obfuscation architecture according to various example embodiments may be implemented on most field-programmable gate arrays (FPGAs), such as using a Xilinx KC705 development board. The obfuscation architecture according to various example embodiments may also be implemented on CMOS processes, such as on UMC 40 nm ULP technology node. Accordingly, various example embodiments advantageously provide a low cost solution to secure SoC system, such as for edge computing, and may be applicable to low cost and low power edge devices.

While embodiments of the invention have been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

What is claimed is:

1. A method of communication between functional blocks in a system-on-chip, the method comprising:
exchanging a respective public key between a first functional block and a second functional block in the system-on-chip for a communication therebetween, the first functional block being a transmitter of the communication and the second function block being a receiver of the communication;
generating, at the first functional block, a first code based on the public key of the second functional block;
generating, at the second functional block, a second code based on the public key of the first functional block;
obfuscating, at the first functional block, an address associated with the communication based on the first code to produce an obfuscated address;
transmitting, at the first functional block, the obfuscated address to the second functional block via an interconnect communication infrastructure in the system-on-chip;
receiving, at the second functional block, the obfuscated address from the first functional block via the interconnect communication infrastructure; and
deobfuscating, at the second functional block, the obfuscated address received based on the second code to produce a deobfuscated address associated with the communication;
wherein said obfuscating, at the first functional block, the address associated with the communication comprises:
generating a first random sequence based on the first code; and
obfuscating the address based on the first random sequence to produce the obfuscated address, and
wherein said deobfuscating, at the second functional block, the obfuscated address comprises:
generating a second random sequence based on the second code; and
deobfuscating the address based on the second random sequence to produce the deobfuscated address associated with the communication.

2. The method according to claim 1, further comprising:
generating, at each of the first functional block and the second functional block, a respective secret key for the communication; and
generating, at each of the first functional block and the second functional block, the respective public key based on the respective secret key.

3. The method according to claim 1,
wherein said generating, at the first functional block, the first code comprises generating a new first code periodically based on a first time interval, and
wherein said generating, at the second functional block, the second code comprises generating a new second code periodically based on a second time interval.

4. The method according to claim 1,
wherein said generating the first random sequence comprises generating the first random sequence based on a first stochastic function, the first stochastic function being synchronized based on a first input clock signal and initialized by the first code functioning as a seed to the first stochastic function, and
wherein said generating the second random sequence comprises generating the second random sequence based on a second stochastic function, the second stochastic function being synchronized based on a second input clock signal and initialized by the second code functioning as a seed to the second stochastic function.

5. The method according to claim 4,
wherein the first stochastic function is configured to generate the first random sequence and the second stochastic function is configured to generate the second random sequence in a manner that is time-dependent, deterministic and cyclic, and
wherein the first and second input clock signals are based on a common clock source.

6. The method according to claim 1, wherein said obfuscating, at the first functional block, the address associated with the communication is completed within a communication latency time.

7. The method according to claim 1, further comprising:
encoding, at the first functional block, the obfuscated address to produce an encoded address; and
decoding, at the second functional block, the encoded address to produce the obfuscated address,
wherein said transmitting, at the first functional block, the obfuscated address to the second functional block comprises transmitting the encoded address including the obfuscated address to the second functional block, and
wherein said receiving, at the second functional clock, the obfuscated address from the first functional block comprises receiving the encoded address including the obfuscated address from the first functional block.

8. The method according to claim 7,
wherein said encoding, at the first functional block, the obfuscated address comprises encoding the obfuscated address based on a first substitution-permutation network comprising a substitution box function and a permutation box function, and wherein said decoding, at the second functional block, the encoded address to produce the obfuscated address comprises decoding the encoded address based on a second substitution-permutation network comprises an inverse substitution box function and an inverse permutation box function.

9. The method according to claim 8, wherein said encoding, at the first functional block, the obfuscated address is selectively enabled, and wherein said decoding, at the second functional block, the encoded address is selectively enabled.

10. A system-on-chip comprising:

a first hardware component configured to implement at least in part a first functional block; and a second hardware component configured to implement at least in part a second functional block communicatively coupled to the first functional block via an interconnect communication infrastructure, wherein the first functional block comprises an address encoder, the address encoder comprising:

a first public key generator configured to exchange a public key with the second functional block for a communication between the first functional block and the second functional block, the first functional block being a transmitter of the communication and the second function block being a receiver of the communication;

a first code generator configured to generate a first code based on the public key of the second functional block;

an address obfuscator configured to obfuscate an address associated with the communication based on the first code to produce an obfuscated address; and an address transmitter configured to transmit the obfuscated address to the second functional block via the interconnect communication infrastructure in the system-on-chip, wherein the second functional block comprises an address decoder, the address decoder comprising:

a second public key generator configured to exchange a public key with the first functional block for the communication;

a second code generator configured to generate a second code based on the public key of the first functional block;

an address receiver configured to receive the obfuscated address from the first functional block via the interconnect communication infrastructure; and an address deobfuscator configured to deobfuscate the obfuscated address received based on the second code to produce a deobfuscated address associated with the communication;

wherein the system-on-chip comprises one or more memories comprising the first public key generator, the first code generator, the address obfuscator, the address transmitter, the second public key generator, the second code generator, the address receiver and the address deobfuscator executable by one or more processors; and wherein the system-on-chip also comprises the one or more processors configured to execute the first public key generator, the first code generator, the address obfuscator, the address transmitter, the second public key generator, the second code generator, the address receiver and the address deobfuscator;

wherein the address obfuscator is configured to:

generate a first random sequence based on the first code; and obfuscate the address based on the first random sequence to produce the obfuscated address, and wherein the address deobfuscator is configured to:

generate a second random sequence based on the second code; and deobfuscate the address based on the second random sequence to produce the deobfuscated address associated with the communication.

11. The system-on-chip according to claim 10, wherein the address encoder further comprises a first secret key generator configured to generate a secret key of the first functional block for the communication, wherein the address decoder further comprises a second secret key generator configured to generate a secret key of the second functional block for the communication, wherein the first public key generator is configured to generate the public key of the first functional block based on the secret key of the first functional block, and wherein the second public key generator is configured to generate the public key of the second functional block based on the secret key of the second functional block.

12. The system-on-chip according to claim 10, wherein the first code generator is configured to generate a new first code periodically based on a first time interval; and wherein the second code generator is configured to generate a new second code periodically based on a second time interval.

13. The system-on-chip according to claim 10, wherein said generate the first random sequence comprises generating the first random sequence based on a first stochastic function, the first stochastic function being synchronized based on a first input clock signal and initialized by the first code functioning as a seed to the first stochastic function, and wherein said generate the second random sequence comprises generating the second random sequence based on a second stochastic function, the second stochastic function being synchronized based on a second input clock signal and initialized by the second code functioning as a seed to the second stochastic function.

14. The system-on-chip according to claim 13, wherein the first stochastic function is configured to generate the first random sequence and the second stochastic function is configured to generate the second random sequence in a manner that is time-dependent, deterministic and cyclic; and wherein the first and second input clock signals are based on a common clock source.

15. The system-on-chip according to claim 10, wherein the address obfuscator is configured to obfuscate the address associated with the communication within a communication latency time.

16. The system-on-chip according to claim 10, wherein the address encoder further comprises an encoder configured to encode the obfuscated address to produce an encoded address, wherein the address decoder further comprises a decoder configured to decode the encoded address to produce the obfuscated address, wherein the address transmitter is configured to transmit the encoded address including the obfuscated address to the second functional block, and wherein the address receiver is configured to receive the encoded address including the obfuscated address from the first functional block.

17. The system-on-chip according to claim 16,
wherein the encoder is configured to encode the obfuscated address based on a first substitution-permutation network comprising a substitution box function and a permutation box function; and
wherein the decoder is configured to decode the encoded address based on a second substitution-permutation network comprises an inverse substitution box function and an inverse permutation box function.

18. A method of forming a system-on-chip, the method comprising:
forming a first functional block on a substrate; and
forming a second functional block on the substrate, the second functional block being communicatively coupled to the first functional block via an interconnect communication infrastructure,
wherein the first functional block comprises an address encoder, the address encoder comprising:
  a first public key generator configured to exchange a public key with the second functional block for a communication between the first functional block and the second functional block, the first functional block being a transmitter of the communication and the second function block being a receiver of the communication;
  a first code generator configured to generate a first code based on the public key of the second functional block;
  an address obfuscator configured to obfuscate an address associated with the communication based on the first code to produce an obfuscated address; and
  an address transmitter configured to transmit the obfuscated address to the second functional block via an interconnect communication infrastructure in the system-on-chip,
wherein the second functional block comprises an address decoder, the address decoder comprising:
  a second public key generator configured to exchange a public key with the first functional block for the communication;
  a second code generator configured to generate a second code based on the public key of the first functional block;
  an address receiver configured to receive the obfuscated address from the first functional block via the interconnect communication infrastructure; and
  an address deobfuscator configured to deobfuscate the obfuscated address received based on the second code to produce a deobfuscated address associated with the communication;
wherein the address obfuscator is configured to:
  generate a first random sequence based on the first code; and
  obfuscate the address based on the first random sequence to produce the obfuscated address, and
wherein the address deobfuscator is configured to:
  generate a second random sequence based on the second code; and
  deobfuscate the address based on the second random sequence to produce the deobfuscated address associated with the communication.

* * * * *